US012790134B2

(12) United States Patent
Casoni et al.

(10) Patent No.: US 12,790,134 B2
(45) Date of Patent: Nov. 10, 2026

(54) APPARATUS FOR GRIPPING AND MOVING PRODUCTS, FOR AUTOMATED MACHINES IN PLANTS FOR PROCESSING AND TRANSPORTING PRODUCTS

(71) Applicants: Silvio Casoni, Scandiano (IT); Daniele Abelzi, Parma (IT)

(72) Inventors: Silvio Casoni, Scandiano (IT); Daniele Abelzi, Parma (IT)

( * ) Notice: Subject to any disclaimer, the term of this patent is extended or adjusted under 35 U.S.C. 154(b) by 847 days.

(21) Appl. No.: 18/031,739

(22) PCT Filed: Sep. 27, 2021

(86) PCT No.: PCT/IB2021/058792
§ 371 (c)(1),
(2) Date: Apr. 13, 2023

(87) PCT Pub. No.: WO2022/079530
PCT Pub. Date: Apr. 21, 2022

(65) Prior Publication Data

US 2023/0382658 A1 Nov. 30, 2023

(30) Foreign Application Priority Data

Oct. 14, 2020 (IT) ........................ 102020000024178

(51) Int. Cl.
*B65G 47/90* (2006.01)

(52) U.S. Cl.
CPC .................................... *B65G 47/90* (2013.01)

(58) Field of Classification Search
CPC ........ B08B 9/42; B08B 9/426; B25J 15/0206; B25J 15/0246; B25J 15/0253;
(Continued)

(56) References Cited

U.S. PATENT DOCUMENTS 8,556,317 B2 * 10/2013 Bodtlander ............ B65G 47/90
901/49
8,701,872 B2 * 4/2014 Fahldieck ............... B67C 3/242
198/803.6
(Continued)

FOREIGN PATENT DOCUMENTS

DE 102005041929 A1 3/2007
DE 102010052348 A1 5/2012
(Continued)

*Primary Examiner* — Joshua E Rodden
(74) *Attorney, Agent, or Firm* — Carmel Patent Agency; Robert Ballarini

(57) ABSTRACT

An apparatus for moving products, in particular for automated machines in plants for processing and transporting products, includes a gripper configured for gripping and releasing a respective product. The gripper includes a first and a second jaw for gripping and releasing the respective product, the first and/or second jaw, being relatively movable between a close engagement and gripping position of the respective product and a distant disengagement and releasing position of the respective product. The apparatus further includes actuation means of the relative movement of said first and/or second jaw. The actuation means move the respective first and/or second jaw according to forces of attraction and/or repulsion of magnetic type.

19 Claims, 8 Drawing Sheets

(58) Field of Classification Search

CPC .. B65G 47/842; B65G 47/846; B65G 47/847; B65G 47/90; B65G 47/901; B65G 47/902; B65G 47/904; B65G 47/907; B65G 47/92; B65G 2201/0244; B65G 2201/0247; B67C 3/24; B67C 3/242; B67C 3/246; F16B 2/00; F16B 2/02; F16B 2/06; F16B 2/10; F16B 2/12

USPC .......................................................... 294/199

See application file for complete search history.

(56) References Cited

U.S. PATENT DOCUMENTS

| | | | | |
|---|---|---|---|---|
| 8,894,114 | B2 * | 11/2014 | Fahldieck | B67C 3/242 294/90 |
| 9,878,483 | B2 * | 1/2018 | Leroux | B65G 47/847 |
| 10,259,665 | B2 * | 4/2019 | Fahldieck | B65G 47/847 |
| 10,501,270 | B2 * | 12/2019 | Fahldieck | B65G 47/847 |
| 11,352,219 | B2 * | 6/2022 | Elmar | B65G 47/90 |
| 11,767,178 | B2 * | 9/2023 | Elmar | B65G 47/847 294/106 |
| 2008/0272609 | A1 * | 11/2008 | Knieling | B65G 47/847 294/90 |
| 2009/0020394 | A1 | 1/2009 | Burgmeier | |
| 2011/0180374 | A1 * | 7/2011 | Fahldieck | B65G 47/90 294/198 |
| 2011/0198198 | A1 * | 8/2011 | Michel | B65G 47/847 294/198 |
| 2011/0308666 | A1 * | 12/2011 | Bodtlander | B65G 47/847 141/165 |
| 2012/0241407 | A1 * | 9/2012 | Fahldieck | B65G 47/847 215/386 |
| 2013/0193702 | A1 * | 8/2013 | Fahldieck | B65G 47/847 294/199 |
| 2014/0232126 | A1 * | 8/2014 | Schulnig | B65G 47/847 294/203 |
| 2014/0238825 | A1 * | 8/2014 | Schulnig | B65G 37/00 294/203 |
| 2018/0327197 | A1 * | 11/2018 | Fahldieck | B65G 47/847 |
| 2020/0148523 | A1 * | 5/2020 | Berceanu | B65G 47/848 |
| 2021/0130109 | A1 * | 5/2021 | Landler | B25J 15/0028 |

FOREIGN PATENT DOCUMENTS

| | | | | |
|---|---|---|---|---|
| EP | 1375395 | A1 * | 1/2004 | B65G 47/847 |
| EP | 2532611 | A1 | 12/2012 | |
| EP | 2881345 | A1 | 6/2015 | |
| EP | 3254996 | A1 * | 12/2017 | B65G 47/847 |
| EP | 3705426 | A1 | 9/2020 | |
| WO | 2013064198 | A1 | 5/2013 | |
| WO | WO-2024157081 | A1 * | 8/2024 | B65G 47/90 |

* cited by examiner

APPARATUS FOR GRIPPING AND MOVING PRODUCTS, FOR AUTOMATED MACHINES IN PLANTS FOR PROCESSING AND TRANSPORTING PRODUCTS

FIELD OF APPLICATION OF THE INVENTION

The present invention is part of the field of product gripping and moving equipment, for automated machines in plants for processing and transporting products.

More precisely, the present invention relates to an apparatus designed to retain and move products such as containers, preferably bottles, which are processed within automated machines or in the passage between one machine and another, for example for forming, filling, packing said containers, in particular bottles.

BACKGROUND

Plants for the manufacture and processing of products are known in various configurations of the prior art.

The term products is intended as products of any kind that need to be handled for the manufacture, or packaging or transport thereof, etc.

In particular, in the following we will refer more frequently to the handling of containers, for example PET bottles, glass bottles, jars, cans etc.

For example, in the case of PET bottles, such plants may include machines that process said product from the parison up to the full bottle and eventually packaging.

Said systems may include various machines such as an oven, blowing machine, buffer, filling machine, capping machine, labelling machine, palletizer, etc.

Said machines are generally arranged in series and connected by conveyor belts that transfer containers from one treatment station to the next.

In said plants, apparatuses for gripping and moving products are used, which involve moving products within several machines and/or on the transfer path between one machine and another.

In particular, said apparatuses comprise gripping devices suitable for retaining containers, preferably bottles, and generally configured to retain a single bottle preferably on the neck.

Prior art apparatuses are known comprising gripping devices movable between an opening and a closing position by distancing or approaching gripping elements configured to engage on said product. The closing is carried out to retain the product and the opening to release it.

Said opening and closing movements are normally obtained by mechanical means such as gears, springs, cams, etc. which act on said gripping elements for the movement thereof. There are numerous variants which include obtaining the opening or closing of the gripping device acting by means of mechanical forces operating by contact.

For example, a well-known solution includes opening or closing the gripping device by acting on one of the two gripping elements, the movement of which is activated, for example, by contact with a cam placed along the working path of the gripping device.

Generally speaking, said gripping devices are configured to translate along the product movement path, which can be a linear or rotary path depending on the type of machine in which the gripping device operates.

For example, along said path there are one or more cams on which a portion of the first gripping element interferes by means of mechanical contact.

Other solutions may include electric or pneumatic actuators that push or pull said first gripping element from the opening to the closing configuration and vice versa.

The movement of the second gripping element may occur independently of the first by similar activation means such as cams or actuators, or alternatively the movement of the second gripping element may be correlated to that of the first.

For example, the gripping elements are synchronized with each other by means of gears which, through mechanical contact, gear to transmit the motion from the first gripping element to the second.

Said apparatuses and relative gripping devices must be reliable over time in order to ensure the seal of the container.

Furthermore, as there are often a large number of such gripping devices in machines, they must be particularly simple and easy to clean to meet high hygiene and maintenance requirements.

On the contrary, all these known solutions lead to wear of the components involved, since there is mechanical contact therebetween, which reduces the reliability thereof over time. In addition, the presence of contacts leads to more complex and difficult solutions to maintain.

Exposure and Advantages of the Invention

The technical problem underlying the present invention is to provide an apparatus for gripping and moving products, for automated machines in plants for processing and transporting products, which is structurally and functionally designed to overcome one or more of the limitations set forth above with reference to the prior art mentioned.

In the context of the aforesaid problem, one of the main objects of the invention is to develop an apparatus for gripping and moving products, for automated machines in plants for processing and transporting products, which makes it possible to reduce the contact between components in order to achieve a solution which is more reliable and less subject to wear over time.

A further object of the invention is to provide the art with an apparatus for gripping and moving products, for automated machines in plants for processing and transporting products as part of a simple rational solution that reduces the maintenance of the device.

In particular, the present invention provides an apparatus for moving products, in particular for automated machines in plants for processing and transporting products, comprising a gripper configured to grip and release a respective product, said gripper comprising a first and a second jaw for gripping and releasing the respective product, said first and/or second jaw being relatively movable between a close engagement and gripping position of the product and a distant disengagement and releasing position of the product, the apparatus further comprising means for actuating the relative movement of said first and/or second jaw.

Said actuation means move the respective first and/or second jaw according to forces of attraction and/or repulsion of magnetic type.

By virtue of this solution, the movement is implemented by means of magnetic forces that do not require contact between mechanical components.

In particular, said actuation means comprise first actuation means for moving the first and/or second jaw one relatively to the other in a close engagement and gripping position of the product, preferably by means of forces of magnetic attraction.

By virtue of this solution, the gripper is closed for gripping the product only by magnetic means.

According to a further aspect of the invention, the actuation means comprise second actuation means for moving the first and/or second jaw relatively to the other in a distant disengagement and releasing position of the product, preferably by means of forces of magnetic repulsion.

By virtue of this solution, the gripper is opened for releasing the product only by magnetic means.

Preferably said actuation means comprise transmission means for moving the first and/or second jaw in an operatively correlated manner, preferably synchronized with each other, by means of forces of magnetic attraction and/or repulsion.

This solution simplifies the application as the movement of one jaw results in the correlated movement of the other jaw. In such a case, therefore, the first and second actuation means are operatively connected to a single jaw, while the other is connected to the first by transmission means, without having specific first and second actuation means for the movement thereof.

An advantageous embodiment of the invention is that the gripper comprises support elements.

Said support elements are preferably positioned between the body and the first and/or second jaw.

A preferred embodiment includes a support element for each jaw.

Furthermore, preferably the support element can also be positioned between the body and the lever.

In particular, said support elements are configured to support said first and/or second jaw and/or lever in a position away from the fulcrums.

By virtue of said support elements, the first and/or second jaw and/or lever work with a cantilevered portion that does not start from the first or second fulcrum, but from said support element and therefore the cantilevered portion is smaller.

This reduces the mechanical stress on the jaws or on the lever, and reduces the resulting deformation; it further limits the formation of clearance due to wear and improves the service life of the gripper.

Said support elements are particularly advantageous in a gripper made according to the invention, in which the actuation means move the respective first and/or second jaw according to forces of attraction and/or repulsion of magnetic type.

In fact in such a case, since there are no mechanical contact connections for transmitting motion from the first to the second jaw, different clearance can be generated between the fulcrum and the respective first or second jaw.

According to an aspect of the invention, said support elements are positioned so that they engage with the first and/or second jaw and/or lever throughout the movement thereof, from the close engagement and gripping position of the product to the distant disengagement and releasing position of the product and vice versa.

Thanks to this solution, the first and/or second jaw and/or the lever always work remaining rested on said support elements and therefore always with a reduced cantilevered portion.

A preferred embodiment includes said support elements mechanically integral with the body.

In particular, said support elements comprise a support portion having a sliding contact surface in sliding contact with said first and/or second jaw and/or lever.

Preferably, said support portion is equal in height to the opening between the body and the first and/or second jaw and/or lever.

Preferably, said support portion has a truncated cone shape.

Alternatively, said support portion may be cylindrical in shape.

Said support portion may comprise the sliding contact surface facing the first and/or second jaw and/or the lever and a fixed contact surface opposed to the previous one and facing the body.

A preferred embodiment shown in the figure involves the sliding contact surface being smaller than the fixed contact surface.

The sliding contact surface being small reduces the first detachment friction; the fixed contact surface being larger improves the fixing stability on the body.

Said support elements may comprise a cylindrical extension extending from the fixed contact surface of the support portion.

Said cylindrical extension is preferably configured to fit into a hole in the body.

This configuration simplifies the construction of the gripper.

Such and other objects are achieved by virtue of the features of the invention reported in independent claim 1. The dependent claims outline preferred and/or particularly advantageous aspects of the invention.

Said objects and advantages are all achieved by the apparatus for gripping and moving products, for automated machines in plants for processing and transporting products, object of the present invention, which is characterized by the following claims.

BRIEF DESCRIPTION OF THE DRAWINGS

These and other features will be more apparent from the following description of certain embodiments illustrated by way of non-limiting example in the accompanying drawings.

DESCRIPTION OF THE INVENTION

Figure 1:
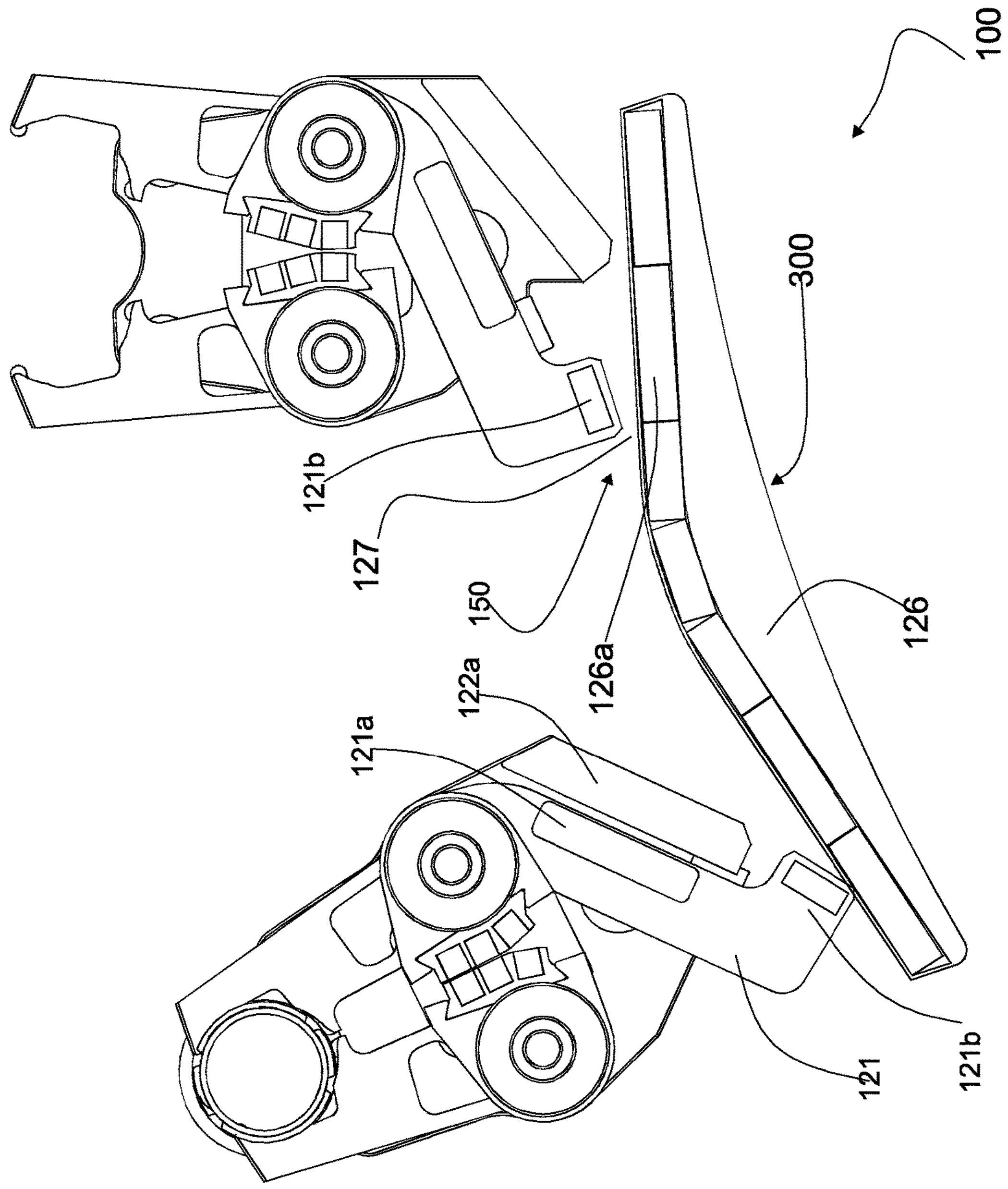
FIG. 1: illustrates a top view of an apparatus for moving products with gripper in a grip-and-release configuration.
Figure 2:
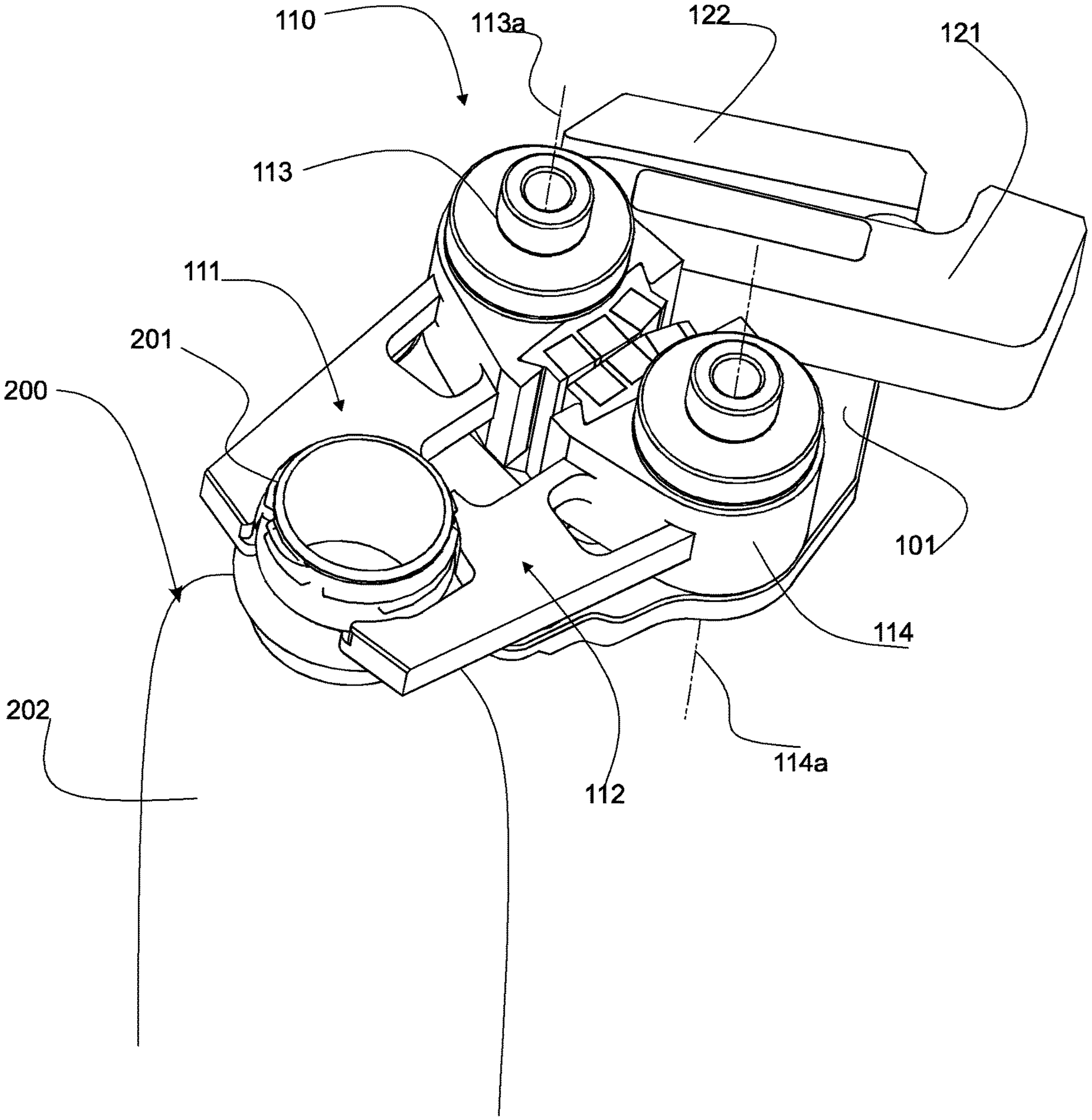
FIG. 2: illustrates an axonometric view of a gripper of the apparatus.
Figure 2A:
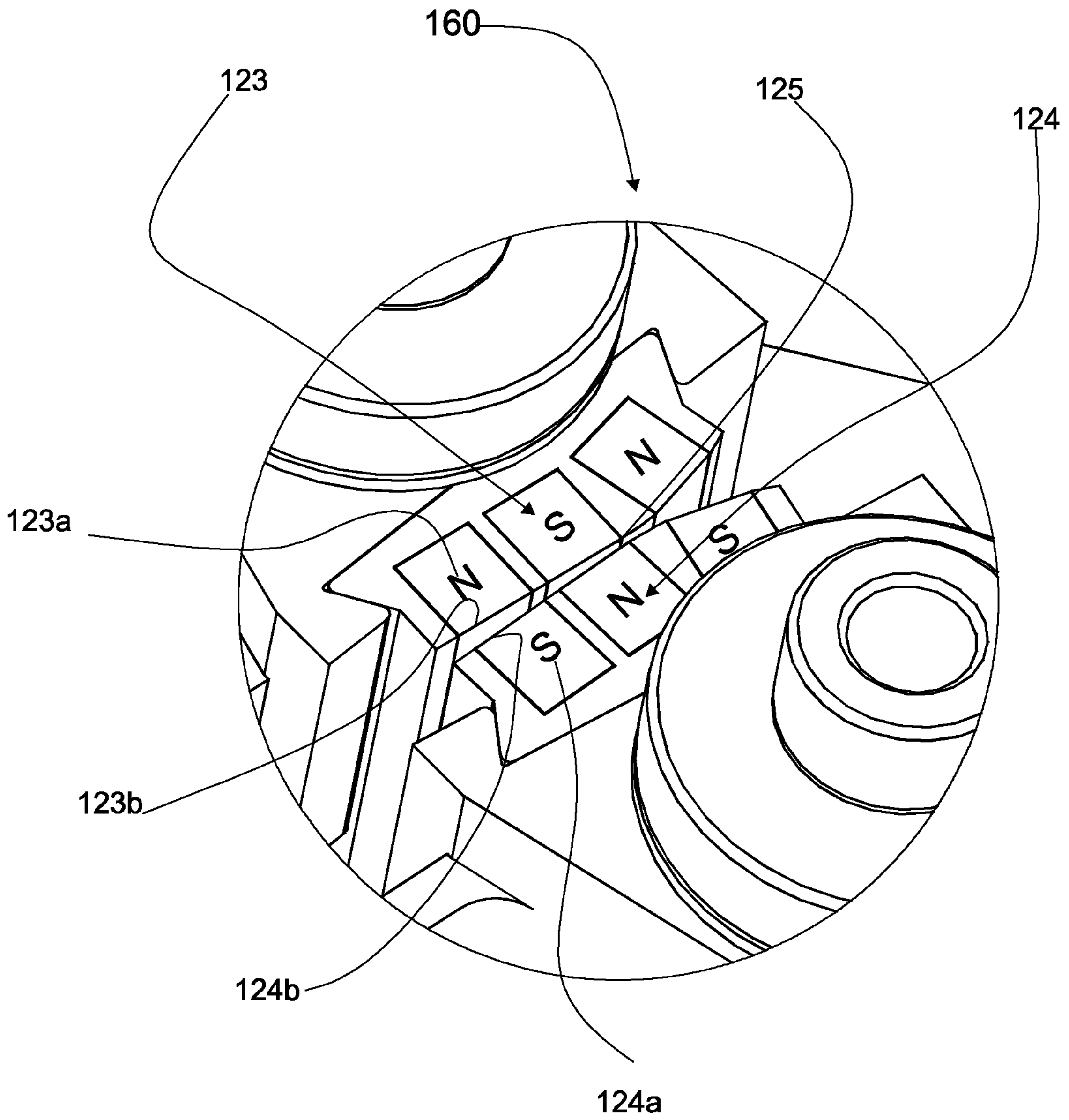
FIG. 2A: illustrates an axonometric view of a detail of the gripper of the apparatus.
Figure 3:
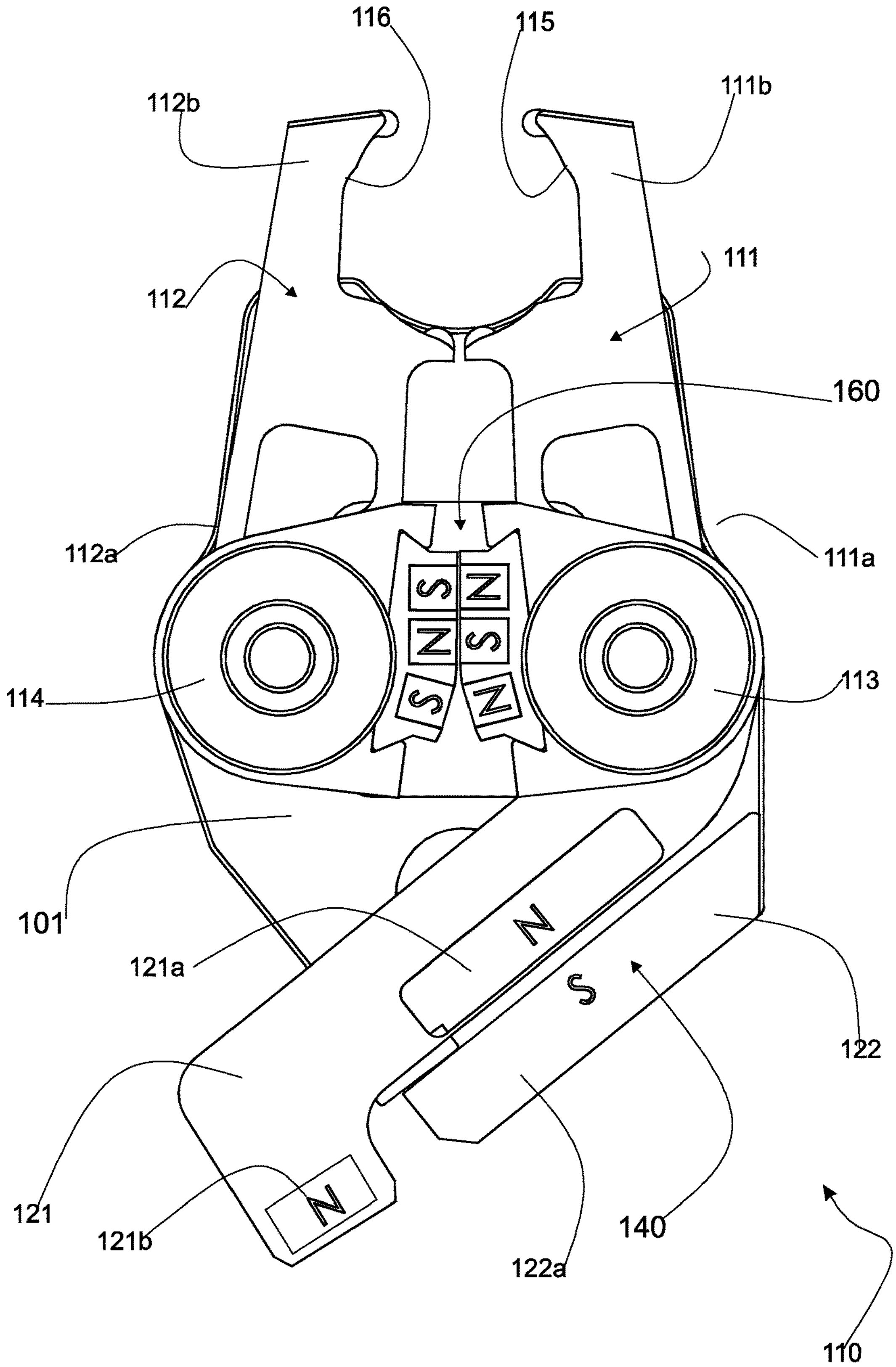
FIG. 3: illustrates a top view of a gripper in gripping configuration.
Figure 4:
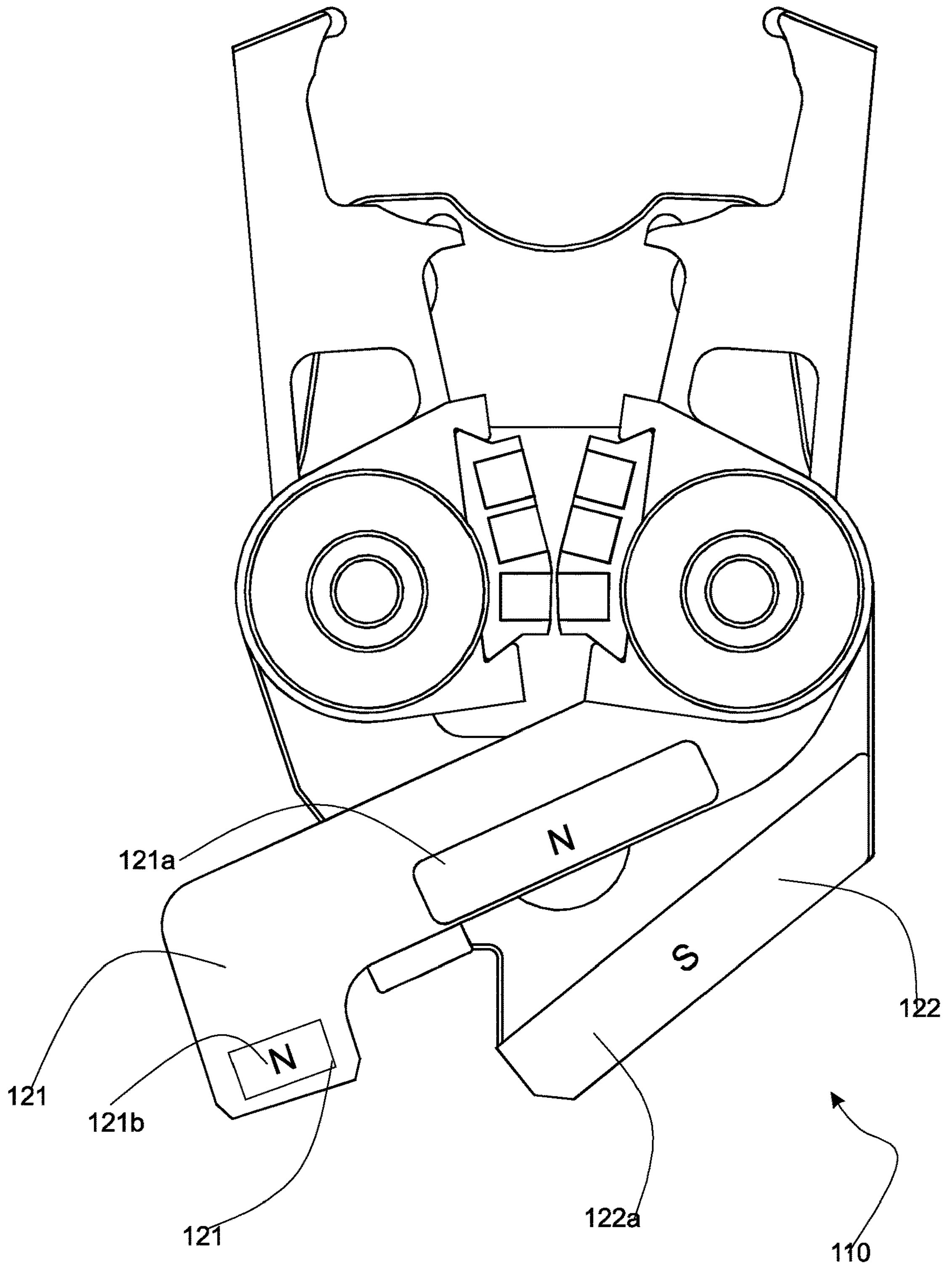
FIG. 4: illustrates a top view of a gripper in release configuration.
Figure 5A:
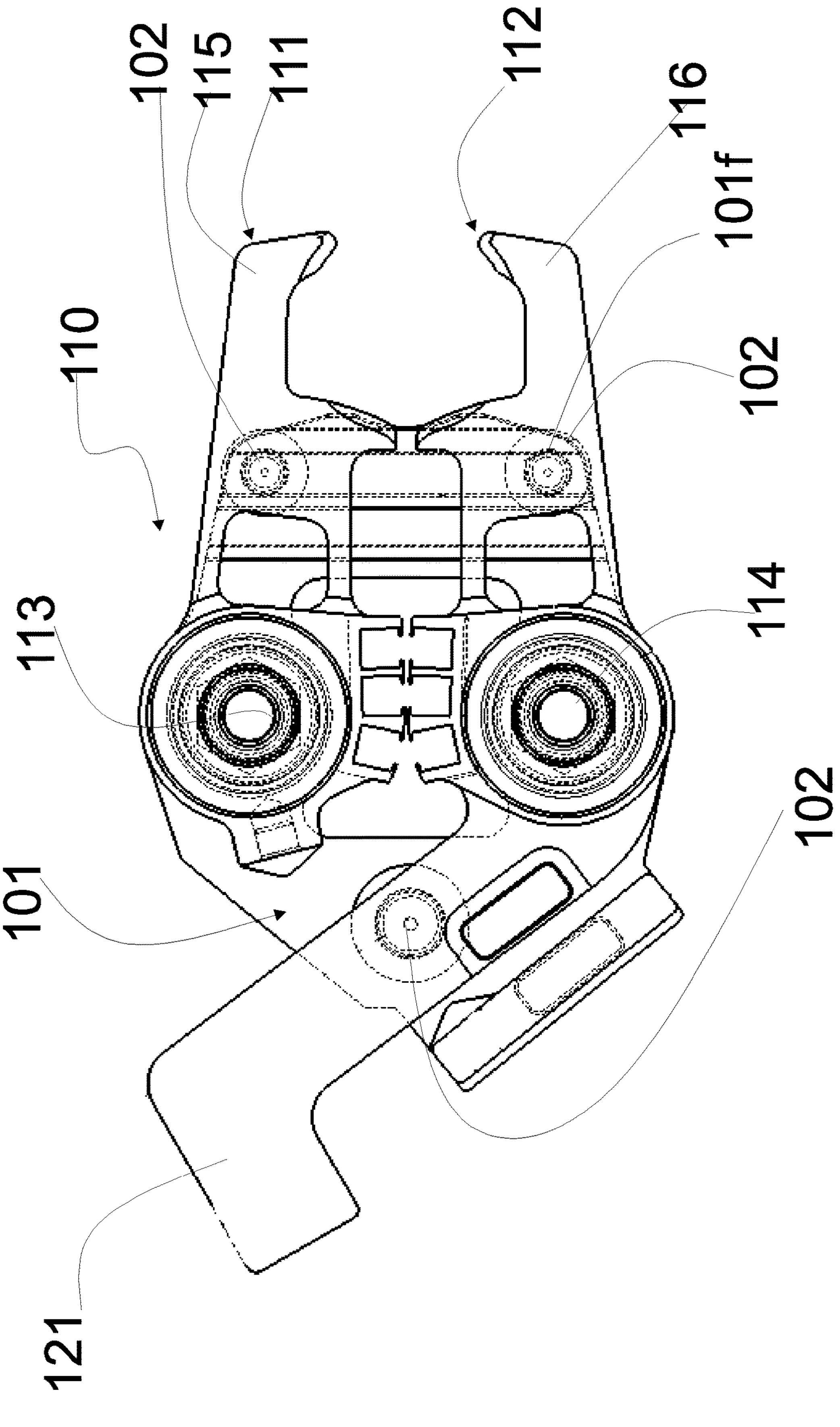
FIG. 5*a*: illustrates a top view of a gripper with support elements.
Figure 5B:
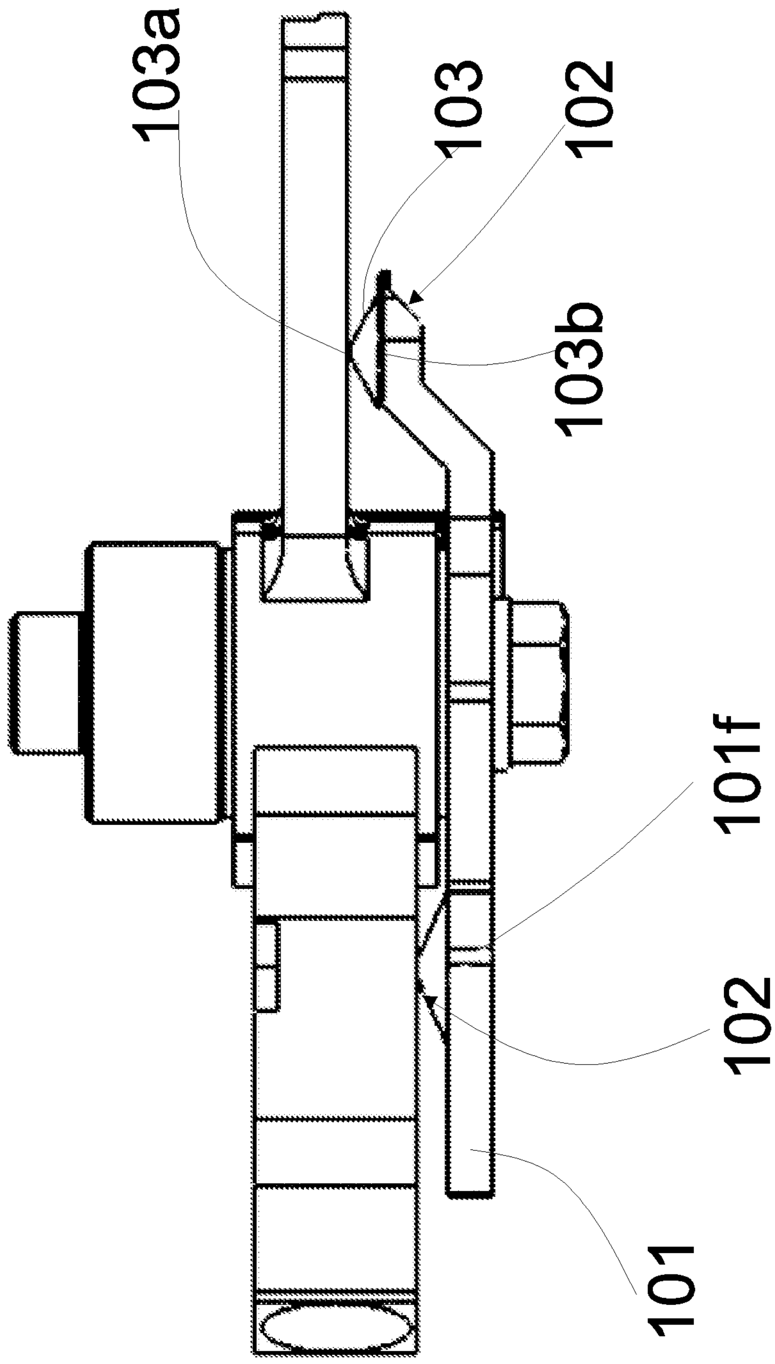
FIG. 5*b*: illustrates a side view of a gripper with support elements.
Figure 5C:
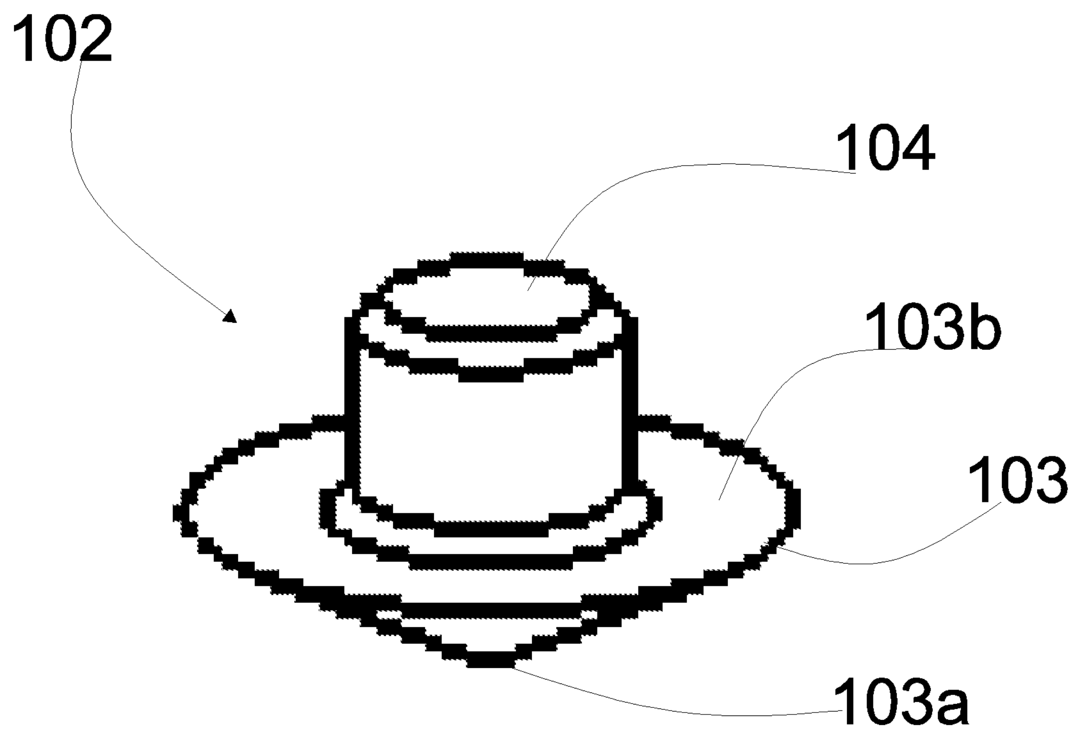
FIG. 5*c*: illustrates an axonometric view of a support element.

The figure shows an apparatus 100 for gripping and moving products 200, in particular for automated machines in plants for processing and transporting products.

Said products can be either loose or packaged products 200. Generally speaking, the products 200 that need to be handled within automated or semi-automated systems in order to undergo the processing operations required for the manufacture thereof. The handling includes the retention and moving of said products 200 both within the processing stations or machines and in the transfer between machines.

In particular among packaged products that can be handled, we will most frequently refer to containers in general and more specifically to containers such as PET bottles, glass bottles, jars, cans, etc.

The apparatus 100 object of the invention comprises a gripper 110 configured for gripping and releasing a respective product 200.

Therefore, the gripper is preferably configured to act in conjunction with a single product 200 at a time, although variants may include that the gripper is configured to grip and release more than one product 200 at a time.

A preferred embodiment further includes that the apparatus 100 comprises more than one gripper 110, preferably a plurality of grippers 110. The number of grippers 110 can be linked to the type of machine in which the apparatus is inserted, the production rate of said machine, the type of container, etc.

According to an aspect of the invention, said one or more grippers 110 may be configured to carry out the gripping and release of a respective product 200 while remaining in a fixed position within the apparatus 100.

Alternatively said one or more grippers 110 may be configured to carry out the gripping and release of a respective product 200 by being movable along a movement path of the products 200.

Said aspect also depends on the type of machine to which the apparatus 100 is operatively connected.

According to a preferred embodiment, said gripper 110 comprises a first jaw 111 and a second jaw 112 for gripping and releasing the respective product 200.

Said first and/or second jaw 111, 112 are relatively movable between a close engagement and gripping position of the product 200 and a distant disengagement and releasing position of the product 200.

In particular, said first and second jaw 111, 112 may both be movable or alternatively one fixed and one movable.

The figures show a preferred embodiment in which both the first and second jaw 111, 112 are movable between a close engagement and gripping position of the product 200 and a distant disengagement and releasing position of the product 200.

Preferably, the embodiment depicted in the figures includes that said first and second jaw 111, 112 move away from or approach each other symmetrically with respect to the product 200 to be retained.

However, it is understood that the foregoing is intended to be illustrative and not limiting, so that any variants including a non-symmetrical movement of the first and second jaw 111, 112 are deemed to fall within the scope of protection of the invention.

Furthermore, said first and/or second jaw 111, 112 can be configured so that the movement of one relative to the other occurs by translation or rotation.

A preferred configuration is shown in the figure, in which the first and/or second jaw 111, 112 are rotatable about a respective first and second fulcrum 113, 114 having axes of rotation 113*a*, 114*a* parallel to each other.

According to a preferred aspect, the gripper 110 comprises a body 101 on which the first and/or second jaw 111, 112 are installed in a rotatable manner.

In particular said first and/or second jaw 111, 112 comprise a respective first and second fulcrum 113, 114 having axes of rotation 113*a*, 114*a* parallel to each other.

Said fulcrums 113, 114 are preferably placed at a first end 111*a*, 112*a* of said first and/or second jaw 111, 112.

In particular, the first and/or second jaw 111, 112 comprise a gripping section 115, 116 placed at a second end 111*b*, 112*b*.

In the above-described configuration in which the jaws 111, 112 are rotatable, said second end 111*b*, 112*b* is positioned away from said fulcrums 113, 114.

In particular, the gripping section 115, 116 is shaped to engage/disengage with the product 200.

Preferably the second end 111*b*, 112*b* and therefore the gripping section 115, 116 protrudes from the body 101. This configuration allows greater flexibility in the gripping type and position of the product 200.

Indeed, for example if the product is a container, in particular a bottle, the gripping section 115, 116 of the respective jaws 111, 112 can be configured to engage on the body 202, or on the neck 201 of said container 200.

The figure shows the first and second jaw shaped to be able to grip at the neck 201 of container 200. This grip is particularly used in the PET bottle movement sector.

The shape of the gripping section 115, 116, the position and length of the respective jaws 111, 112, vary as a function of the type of product 200 and the gripping position of said product 200.

In accordance with the aforesaid objects, the invention relates to an apparatus in which the gripping and releasing of the product 200, occurs by means of said first and/or second jaw 111, 112 relatively movable between a close engagement and gripping position of the product 200 and a distant disengagement and releasing position of the product 200.

In order to perform the gripping and release of the product 200, the apparatus 100 comprises means for actuating 140, 150, 160 the relative movement of said first and/or second jaw 111, 112.

Advantageously, said actuation means 140, 150, 160 move the respective first and/or second jaw 111, 112 according to forces of attraction and/or repulsion of magnetic type.

In particular, said actuation means 140, 150, 160, may comprise first actuation means 140 and/or second actuation means 150 and/or transmission means 160, which will be explained in detail below.

In accordance with possible embodiments the first actuation means 140 are configured to move the first and/or second jaw 111, 112 relative to each other in a close engagement and gripping position of the product 200.

According to a preferred embodiment shown in the figure, the first actuation means 140 operate through forces of magnetic attraction. The alternative solution in which the first actuation means 140 operate through forces of magnetic repulsion is also the object of the invention.

Preferably, the second actuation means 150 are configured to move the first and/or second jaw 111, 112 relative to each other in a distanced disengagement and releasing position of the product 200.

According to a preferred embodiment depicted in the figure, second actuation means 150 operate through forces of magnetic repulsion. The object of the invention is also the alternative solution in which second actuation means 150 operate through forces of magnetic attraction.

Further preferably the transmission means 160 are configured to move the first and/or second jaw 111, 112 in an operatively correlated manner, preferably synchronized with each other.

According to a preferred embodiment depicted in the figure, transmission means 160 operate by means of forces of magnetic attraction and/or repulsion.

In a formulation of the present invention, depicted in the figures, the first actuation means 140 and the second actuation means 150 act on the first or second jaw 111, 112 putting it into rotation, while the other first or second jaw 111, 112 is put into rotation by the transmission means 160 so that said first and second jaw 111, 112 move in a correlated, preferably synchronized manner.

As shown in the figure, the first actuation means 140 and the second actuation means 150 act on the first jaw 111.

The second jaw 112 is rotated by the transmission means 160 in a correlated manner, preferably synchronized with the first jaw 111.

In accordance with said feature of the present invention when the first actuation means 140 act on the first or second jaw 111, 112 putting it into rotation, the transmission means 160 act on the other first or second jaw 111, 112 putting it into rotation by means of forces of attraction that bring and keep the first jaw 111 and the second jaw 112 in a close engagement and gripping position of the product 200.

Conversely, when the second actuation means 150 act on the first or second jaw 111, 112 putting it into rotation, the actuation means 160 act on the other first or second jaw 111, 112 putting it into rotation by means of forces of repulsion which bring and keep the first jaw 111 and the second jaw 112 in a distant disengagement and releasing position of the product 200.

However, it is understood that what is described above is an example and not a limitation. In fact, other possible configurations not shown in the figures fall within the scope of protection of the present invention.

For example, the apparatus 100 may include that the gripper 110 obtains the gripping of the product 200 by first actuation means 140 configured to move both the first and second jaw 111, 112 in close engagement and gripping position of the product 200. Similarly, the gripper 110 can obtain the gripping and release of the product 200 by second actuation means 150 configured to move both the first and second jaw 111, 112 into a distanced disengagement and releasing position of the product 200.

Thus, the first actuation means 140 and the second actuation means 150 act on both the first and on the second jaw 111, 112.

In such a case there may be no transmission means 160.

This solution has the disadvantage of not correlating the movement of the first and second jaw 111, 112 with each other and therefore not ensuring the perfect synchronization of the movement thereof both when gripping and when releasing.

According to a preferred embodiment, the first actuation means 140 are provided on the gripper 110.

Thus said first actuation means 140 are all installed on the gripper 110.

An embodiment not depicted in the figures includes that the first actuation means 140 comprise an operative element **122*a* that is integral with the first jaw 111 and is configured to act in conjunction with an opposed operative element 121*a* that is integral with the second jaw 112 which, by means of forces of magnetic attraction, brings said first and second jaw 111, 112 in close engagement and gripping position of the product 200**.

A different embodiment depicted in the figures involves that said first actuation means 140 comprise an operative element **122*a* that is integral with the body 101 and is configured to act in conjunction with an opposed operative element 121*a* that is integral with the first and/or the second jaw 111, 112 which, preferably by means of forces of magnetic attraction, puts said first and/or second jaw 111, 112 into rotation about the respective axes of rotation 113*a*, 114*a* at the respective fulcrum 113, 114**.

Preferably, the operative element **122*a* is integral with an abutment 122 preferably installed on the body 101**.

The opposed operative element **121*a* is preferably integral with a lever 121 of the gripper 110**.

In fact, as depicted in the figures, the gripper 110 may comprise a lever 121 rotatable about the axis of rotation **113*a*, 114*a* and operatively associated with the first jaw 111 or second jaw 112**.

Said lever 121 is configured so that the rotation thereof imparts a rotation to the first jaw 111 or second jaw 112 with which it is operatively associated.

Preferably, the rotation of the lever 121 corresponds to an equal rotation of the first jaw 111 and/or second jaw 112 with which it is operatively associated.

In particular, said lever 121 is placed away from the first or second fulcrum 113, 114 in a direction opposite the gripping section 115, 116.

Preferably, said lever 121 protrudes from the body 101.

Accordingly, said operative element **122*a* and opposed operative element 121*a* act in conjunction, exerting forces of magnetic attraction acting on said lever 121 to bring it and keep it close to said abutment 122**.

The approach of the lever 121 to the abutment 122 brings and keeps the first jaw 111 and/or second jaw 112, to which the lever 121 is operatively connected, in a close engagement and gripping position of the product 200.

An embodiment includes that the lever 121 may rest on the abutment 122 thereby defining an end position, of the engagement position, of the first jaw 111 and/or second jaw 112, to which the lever 121 is operatively connected.

Thus, the function of the abutment 122 is not only to act as a support for the operative element **122*a*, but also to define a limit position for the lever 121 and the corresponding jaw 111, 112** with which it is associated.

In particular, in the figures, the lever 121 is operatively connected to the first jaw 111. This configuration is only illustrative as the lever 121 may alternatively be operatively connected to the second jaw 112.

In a further possible configuration, the gripper 110 may comprise both a lever 121 operatively connected to the first jaw 111 and a further lever 121 operatively connected to the second jaw 112, each lever 121 being associated with a respective operative element **122*a*. In said last configuration, there may be an abutment 122, with which an opposed operative element 121*a* is associated, for each lever 121**.

A preferred embodiment includes that the operative element **122*a*** is a magnetic element, in particular a permanent magnet.

Further preferably also the opposed operative element **121*a*** is a magnetic element, in particular a permanent magnet.

Alternatively, the operative element **122*a* and/or the opposed operative element 121*a*** may be a magnetic element of the electromagnet type.

A further alternative may include that the operative element **122*a* or the opposed operative element 121*a*** is ferromagnetic material.

For example, the opposed operative element **121*a* integral with the lever 121 may be defined by the ferromagnetic material with which the lever 121** may be made.

Said ferromagnetic material of said lever 121 is subject to the forces of magnetic attraction of the operative element **122*a*** with which it acts in conjunction.

Conversely, the operative element 122*a* integral with the abutment 122 may be defined by the ferromagnetic material with which the abutment 122 may be made.

Said ferromagnetic material of the abutment 122 is subject to the forces of magnetic attraction of the opposed operative element 121*a* with which it acts in conjunction.

A preferred embodiment includes that both the operative element 122*a* and the opposed operative element 121*a* are a magnetic element of the permanent magnet type.

In such a case, for example, the operative element 122*a* is a magnetic element with a single polarity which is opposite that of the magnetic element of the opposed operative element 121*a*.

By virtue of this configuration, the attraction between the operative element 122*a* and the opposed operative element 121*a* can be easily and effectively obtained.

An embodiment not depicted in the figures includes that the second actuation means 150 comprise an activation element 126*a* that is integral with the first jaw 111 and is configured to act in conjunction with an opposed activation element 121*b* that is integral with the second jaw 112 which, by means of forces of magnetic repulsion, brings said first and second jaw 111, 112 in distant disengagement and releasing position of the product 200.

A different embodiment depicted in the figures includes that as regards the opening of the gripper 110, the second actuation means 150 may comprise an activation element 126*a* installed in a gripping/releasing area 300 of the apparatus 100, configured to act in conjunction with an opposed activation element 121*b* that is integral with the first and/or second jaw 111, 112 which, by means of forces of magnetic repulsion, puts said first and/or second jaw 111, 112 into rotation about the respective axes of rotation 113*a*, 114*a* at the respective fulcrum 113, 114.

In the gripping/releasing area 300 of the apparatus 100, the gripper 110 switches from gripping to releasing the product 200 or vice versa.

In fact, normally the gripper 110 is kept in a closed or gripping configuration by the first actuation means 140 and changes the configuration thereof at the gripping/releasing area 300.

Said gripping/releasing area 300 comprises a profile 126.

Preferably, as depicted in the figures, the activation element 126*a* is integral with the profile 126 installed in the gripping/releasing area 300 of the apparatus 100.

Further preferably, the opposed activation element 121*b* is integral with the lever 121.

The apparatus 100, includes a relative movement between the gripper 110 and the profile 126.

Thereby, when the gripper 110 and the profile 126 are in a position facing each other, and consequently the activation element 126*a* and the opposed activation element 121*b* are facing each other, the gripper 110 changes the configuration thereof from gripping to releasing or vice versa.

Preferably, the gripper 110 is movable along a movement path of the product 200 of the apparatus 100 and the profile 126 is in a fixed position on said path.

In particular, said activation element 126*a* and opposed activation element 121*b* act in conjunction by expressing forces of magnetic repulsion adapted to put the lever 121 into rotation about the respective axis of rotation 113*a*, 114*a* to bring and keep it away from the operative element 122*a*, subsequently bringing and keeping the first jaw 111 and/or second jaw 112 to which the lever 121 is operatively connected, in distant disengagement and releasing position of the product 200.

Preferably, the lever 121 moves away from the abutment 122 when it is facing the profile 126.

A preferred embodiment includes that the activation element 126*a* is a magnetic element, in particular a permanent magnet.

Further preferably, also the opposed activation element 121*b* is a magnetic element, in particular a permanent magnet.

Alternatively, the activation element 126*a* and/or the opposed activation element 121*b* may be a magnetic element of the electromagnet type.

A further alternative may include that the activation element 126*a* or the opposed activation element 121*b* is ferromagnetic material.

For example, the opposed activation element 121*b* integral with the lever 121 may be defined by the ferromagnetic material with which the lever 121 may be made.

Said ferromagnetic material of the lever 121 is subject to the forces of magnetic attraction of the activation element 126*a* with which it acts in conjunction.

Conversely, the activation element 126*a* integral with the profile 126 can be defined by the ferromagnetic material with which the profile 126 may be made.

Said ferromagnetic material of the profile 126 is subject to the forces of magnetic attraction of the opposed activation element 121*b* with which it acts in conjunction.

A preferred embodiment includes that both the activation element 126*a* and the opposed activation element 121*b* are a magnetic element of the permanent magnet type.

In such a case, for example, the activation element 126*a* is a magnetic element with a single polarity which is the same as that of the magnetic element of the opposed activation element 121*b*.

By virtue of this configuration, the repulsion between the activation element 126*a* and the opposed activation element 121*b* can be easily and effectively obtained.

In particular, a gap/opening 127 is present between the activation element 126*a* and the opposed activation element 121*b*, i.e. they act in conjunction without contact.

Preferably, also the lever 121 and profile 126 act in conjunction without contact.

This solution reduces the wear on the mechanical components involved and simplifies maintenance operations.

An aspect of the invention includes that the force of repulsion between the activation element 126*a* and the opposed activation element 121*b* when they are facing each other is greater than the force of attraction between the operative element 122*a* and the opposed operative element 121*a* when they are facing each other.

The resultant of said forces therefore enables the first and second jaw 111, 112 to be moved away and the gripper 110 to be opened.

Preferably, the opposed operative element 121*a* is installed on the lever 121 close to the fulcrum 113, 114 of the first or second jaw 111, 112 with which it is operatively associated, while the opposed activation element 121*b* is installed on the lever 121, on a portion thereof further away from the fulcrum 113, 114 of the first or second jaw 111, 112 with which it is operatively associated.

This position causes the force exerted at the opposed activation element 121*b* to generate a greater momentum since the arm on which it works is greater than the arm on which the force exerted at the opposed operative element 121*a* works.

The opening force is therefore greater than the closing force.

The fact that the actuation means 140, 150, 160 comprise transmission means 160 is a further object of the invention.

Said the transmission means 160 are preferably provided on the gripper 110. In particular, the transmission means 160 comprise a first transmission element 123 integral with the first jaw 111 configured to act in conjunction with a second transmission element 124 integral with the second jaw 112 which, by means of forces of magnetic attraction/repulsion, puts said first and/or second jaw (111, 112) into rotation about the respective axes of rotation (113*a*, 114*a*) at the respective fulcrum (113, 114).

According to an embodiment, the first and the second transmission element 123, 124 are rotatable in integral manner with the respective first and second jaw 111, 112 and are configured so that the rotation of said first or second transmission element 123, 124 imparts a rotation to the respective first jaw 111 or second jaw 112.

Advantageously, the first transmission element 123 respectively comprises a first sequence of magnets 123*a*, in particular permanent magnets, comprising a plurality of magnets arranged so that each has opposite polarity to the preceding one and successive one.

Preferably also the second transmission element 124, respectively comprising a second sequence of magnets 124*a* in particular permanent magnets, comprising a plurality of magnets arranged so that each has opposite polarity to the preceding one and successive one.

Alternatively, the first sequence of magnets 122*a* and/or the second sequence of magnets 124*a* may be magnets of the electromagnet type.

As depicted in the figures in which the magnets of the first sequence 123*a* oppose the magnets of opposite polarity of the second sequence 124*a* preferably when the first and the second jaw 111, 112 are in symmetrical position with respect to the product 200.

A preferred embodiment in which the first and the second sequences of magnets 123*a*, 124*a* each comprise a succession of magnets arranged according to a portion of a circumference 123*b*, 124*b* about the axes of rotation 113*a*, 114*a* is shown in the figures.

By virtue of this solution, the two jaws 111, 112 move in a correlated manner.

In particular as shown in the figures, the first actuation means 140 and the second actuation means 150 act on the first jaw 111, moving it close to or away from the second jaw 112, while the transmission means 160 act on said second jaw 112, moving it in correlated manner, preferably synchronized with the first jaw 111.

Preferably, the rotation of the first jaw 111 results in an equal but opposite rotation of the second jaw 112.

This ensures that the gripper 110 opens/closes symmetrically with respect to the container.

Advantageously, a gap/opening 125 is present between the first and second transmission element 123, 124, i.e. they act in conjunction without contact.

By virtue of this solution, the motion is transferred from the first jaw 111 to the second jaw 112 without contact between the components involved, unlike the traditional methods of transmitting motion by means of gears, connecting rods, clutches, etc.

This ensures a greater reliability and durability of the gripper 110 over time.

It also simplifies the hygienic design of the gripper, simplifying maintenance operations.

Precisely because of the aforesaid important advantage, a possible variant may include that the gripper 110 comprises actuation means 140, 150, 160, whereby only the actuation means 160 act according to forces of a magnetic type, whereas the first actuation means 140 and the second actuation means 150 may be obtained according to means of a known type, for example by means of mechanical actuators.

An advantageous embodiment of the invention includes that the gripper 110 comprises support elements 102.

Said support elements 102 are preferably positioned between the body 101 and the first and/or second jaw 111, 112. A preferred embodiment includes a support element 102 for each jaw 111, 112.

Further preferably, the support element 102 may be positioned between the body 101 and the lever 121.

In particular, said support elements 102 are configured to support said first and/or second jaw 111, 112 and/or lever 121 in a position away from said fulcrums 113, 114.

By virtue of said support elements 102, the first and/or second jaw 111, 112 and/or lever 121, work with a cantilevered portion that does not start from the first or second fulcrum 113, 114, but from said support element 102 and therefore the cantilevered portion is smaller.

This reduces the mechanical stress on the jaws 111, 112 or the lever 121, and reduces the resulting deformation; it also limits the formation of clearance due to wear and improves the service life of the gripper 110.

In fact, said support elements 102 are preferably interposed between the first or second fulcrum 113, 114 and the gripping section 115, 116.

Said support elements 102 are particularly advantageous in a gripper 110 made according to the invention, in which the actuation means 140, 150, 160 move the respective first and/or second jaw 111, 112 according to forces of attraction and/or repulsion of magnetic type.

In fact, in such a case, since there are no mechanical contact connections to transmit the motion from the first to the second jaw 111, 112, different clearance can be generated between the fulcrum 113 and 114 and the respective first or second jaw 111, 112.

Said support elements 102 can also be used in grippers 110 made with the first and second jaw 111, 112 moved without the use of magnetic forces, but by means, for example, of forces due to mechanical connection or contact.

According to an aspect of the invention, said support elements 102 are positioned so that they engage with the first and/or second jaw 111, 112 and/or the lever 121 throughout the movement thereof, from the close engagement and gripping position of the product 200 to the distant disengagement and releasing position of the product 200 and vice versa.

By virtue of this solution, the first and/or second jaw 111, 112 and/or the lever 121 always work remaining rested on said support elements 102 and therefore always with a reduced cantilevered portion.

A possible, but less performing solution may include that said support elements 102 engage with the first and/or second jaw 111, 112 only when the gripper 110 is in a close engagement and gripping position. In fact, in such a case, the weight of the product 200 increases the stress and deformation of the jaw 111, 112 and in particular of the cantilevered portion thereof.

A preferred embodiment includes that said support elements 102 are mechanically integral with the body 101.

The figure shows a possible embodiment with three support elements 102, installed on the body 101.

Preferably, the first and second jaw 111, 112 and/or lever 121, slide on the respective support elements 102 which remain in a fixed position.

In particular, said support elements 102 comprise a support portion 103 having a sliding contact surface 103*a* in sliding contact with said first and/or second jaw 111, 112 and/or lever 121.

Said support portion 103 and, in particular, said sliding contact surface 103*a* is preferably made of or coated with a material that allows working on the first and/or second jaw 111, 112 and/or lever 121 generating low friction.

For example, said sliding contact surface 103*a* can be made of self-lubricating sacrificial plastic.

More generally, the material of the support element 102 is made of material which wears out before the material of the gripper 110 with which it is in sliding contact. Thus, in the face of operational wear, the support element 102 can be replaced and not the first and/or second jaw 111, 112 and/or the lever 121 which are more complex and expensive parts.

Preferably, said support portion 103 has a height equal to the opening present between the body 101 and the first and/or second jaw 111, 112 and/or the lever 121, compatibly with dimensional tolerances known to those skilled in the art.

Preferably, said support portion 103 has a truncated cone shape, as shown in the figure. A truncated cone shape also means, for example, a conical portion with the tip connected or flattened to allow engagement with the first and/or second jaw 111, 112 and/or the lever 121.

Alternatively, said support portion 103 may be cylindrical in shape.

Alternatively, said support portion 103 may have a hemispherical shape.

It is understood, however, that any form that a person skilled in the art deems suitable to slidably engage between the body 101 and the first and/or second jaw 111, 112 and/or the lever 121 is within the scope of protection of the invention.

Said support portion 103 may comprise a sliding contact surface 103*a* facing the first and/or second jaw 111, 112 and/or the lever 121 and a fixed contact surface 103*b* opposed to the previous one and facing the body 101.

A preferred embodiment depicted in the figure includes that the sliding contact surface 103*a* is smaller than the fixed contact surface 103*b*.

The sliding contact surface 103*a* being small reduces the first detachment friction; the larger fixed contact surface 103*b* improves the stability of the fixing on the body 101.

In particular, the fixing of the support element 102 to the body 101 can be obtained, as depicted in the figure.

Said support elements 102 may comprise a cylindrical extension 104 extending from the fixed contact surface 103*b* of the support portion 103.

Said cylindrical extension 104 is preferably configured to fit into a hole 101*f* of the body 101.

Said cylindrical extension 104 preferably has a diameter of a smaller size than the fixed contact surface 103*b*.

Thereby, no screws or locking elements are required, but the support element 102 is simply inserted into the hole 101*f* and held in position by the support portion 103, which having a height equal to the opening between the body 101 and the first and second jaw 111, 112 and/or lever 121, does not allow the cylindrical extension 104 to exit the hole 101*f*.

This configuration simplifies the construction of the gripper 101.

It is a further object of the invention, the gripper 110 usable in the apparatus 100 for moving products 200, in particular for automated machines in plants for processing and transporting products 200 configured according to the features described above.

It in any case is intended for that described above to be given by way of non-limiting example; therefore possible detail variants that may be required for technical and/or functional reasons are considered from now as to fall within the same protective scope defined by the claims below.

The invention claimed is:

1. An apparatus for gripping and moving products, for automated machines in plants for processing and transporting products, the apparatus comprising a gripper configured to grip and release a respective product of the products, said gripper comprising a first and a second jaw for gripping and releasing the respective product, at least one of said first or said second jaw being relatively movable between a close engagement and gripping position of the respective product and a distant disengagement and releasing position of the respective product, the apparatus further comprising actuation means of the relative movement of at least one of said first or said second jaw wherein said actuation means move at least one of the respective first or second jaw according to at least one of magnetic forces of attraction or repulsion, and wherein the actuation means comprise transmission means for moving at least one of the first or the second jaw in operatively correlated manner, mutually synchronized, through at least one of forces of magnetic attraction or magnetic repulsion.

2. The apparatus according to claim 1, wherein the actuation means comprise first actuation means for moving at least one of the first or the second jaw one relatively to the other in close engagement and gripping position of the product, through forces of magnetic attraction.

3. The apparatus according to claim 2, wherein the actuation means comprise second actuation means for moving at least one of the first or the second jaw one relatively to the other in distant disengagement and releasing position of the product, through forces of magnetic repulsion.

4. The apparatus according to claim 3, wherein the first actuation means and the second actuation means act on the first jaw, moving the first jaw towards or away from the second jaw, while the transmission means act on said second jaw, moving the second jaw in correlated manner, synchronized with the first jaw.

5. The apparatus according to claim 3, wherein the gripper comprises a body on which at least one of the first or the second jaw are installed in a rotatable manner, at least one of said first or the second jaw comprise a respective first and second fulcrum having axes of rotation parallel to each other, said fulcrums being placed at a first end of at least one of said first or said second jaw.

6. The apparatus according to claim 5, wherein at least one of the first or the second jaw comprise a gripping section placed at a second end away from at least one of said first or said second fulcrum, protruding from the body and shaped to engage with or disengage from the product.

7. The apparatus according to claim 5, wherein the gripper comprises a lever that is rotatable about a respective axis of rotation and is operatively associated with the first jaw or second jaw and is configured so that the rotation of said lever imparts a rotation to the first jaw or second jaw with which the lever is operatively associated.

8. The apparatus according to claim 5, wherein the first actuation means comprise an operative element that is integral with the body and is configured to act in conjunction with an opposed operative element that is integral with the second jaw which, by means of forces of magnetic attraction, puts at least one of said first or said second jaw into rotation about the respective axes of rotation at the respective fulcrum.

9. The apparatus according to claim 8, wherein at least one of the operative element or the opposed operative element is a permanent magnet.

10. The apparatus according to claim 5, wherein the second actuation means comprise an activation element installed in a gripping/releasing area of the apparatus, configured to act in conjunction with an opposed activation element that is integral with at least one of the first or the second jaw which, by means of forces of magnetic repulsion, puts at least one of said first or second jaw into rotation about the respective axes of rotation at the respective fulcrum.

11. The apparatus according to claim 10, wherein at least one of the activation element or the opposed activation element is a permanent magnet.

12. The apparatus according to claim 10, wherein the activation element is integral with a profile installed in the gripping/releasing area of the apparatus and wherein said apparatus provides a relative movement between the gripper and the profile to bring them into position facing each other in the gripping/releasing area.

13. The apparatus according to claim 10, further comprising a gap or opening between the activation element and the opposed activation element, wherein the activation element and opposed activation element act in conjunction without contact.

14. The apparatus according to claim 5, wherein the gripper comprises support elements positioned between the body and at least one of the first or second jaw or the lever configured to support at least one of said first or second jaw or lever away from the fulcrums.

15. The apparatus according to claim 2, wherein the first actuation means are provided on the gripper.

16. The apparatus according to claim 1, wherein the transmission means are provided on the gripper, for moving the first and/or the second jaw in operatively correlated manner.

17. The apparatus according to claim 16, wherein the transmission means comprise a first transmission element that is integral with the first jaw configured to act in conjunction with a second transmission element that is integral with the second jaw which, by means of forces of magnetic attraction or repulsion, puts at least one of said first or second jaw into rotation about a respective fulcrum.

18. The apparatus according to claim 17, wherein at least one of the first transmission element or the second transmission element comprise respectively a first sequence of permanent magnets, comprising a plurality of magnets arranged so that each one has opposite polarity to a preceding one and a successive one.

19. The apparatus according to claim 17, further jap or opening between the first and second transmission elements, wherein the first and second transmission elements act in conjunction without contact.

* * * * *